Oct. 5, 1926.  
J. B. BAYNES  
1,601,842  
FOUR-CYCLE INTERNAL COMBUSTION ENGINE  
Filed Oct. 16, 1925   3 Sheets-Sheet 2

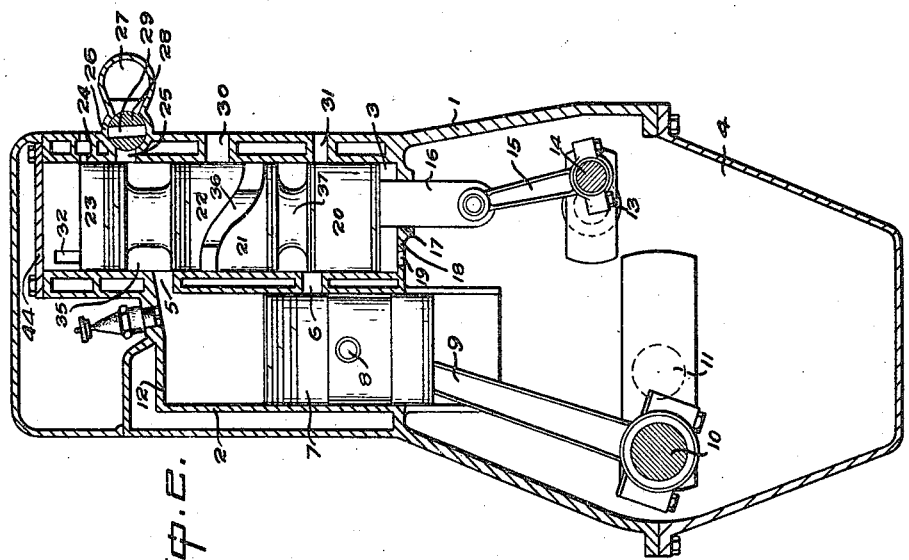
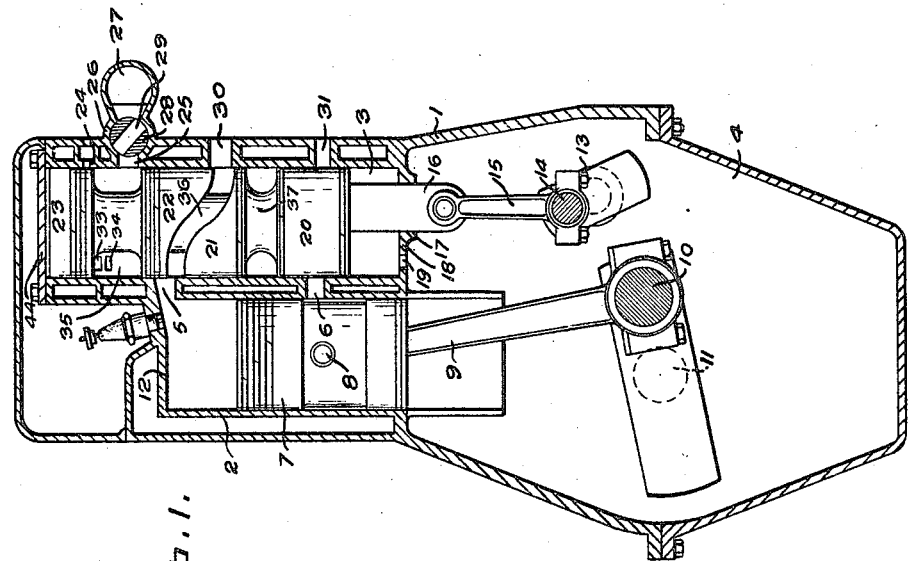

INVENTOR  
JAMES B. BAYNES.

Oct. 5, 1926.
J. B. BAYNES
1,601,842
FOUR-CYCLE INTERNAL COMBUSTION ENGINE
Filed Oct. 16, 1925      3 Sheets-Sheet 3
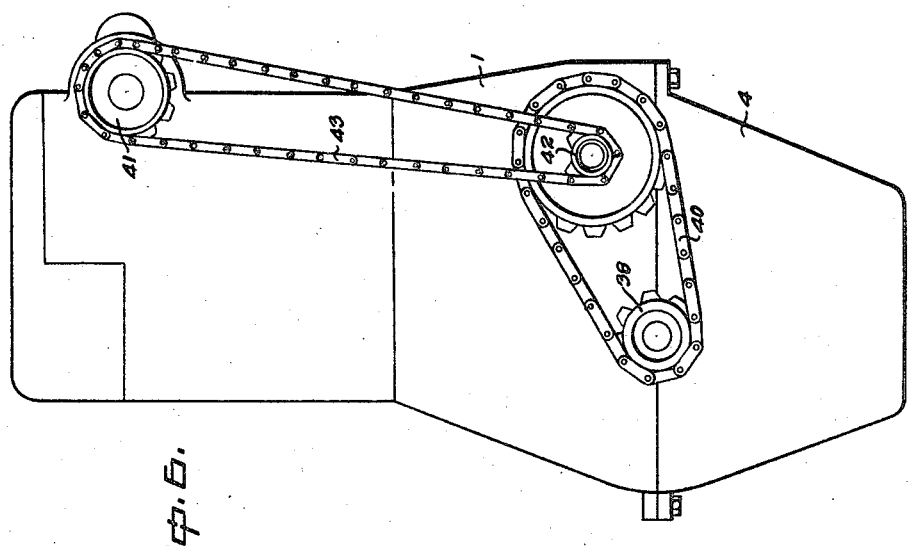
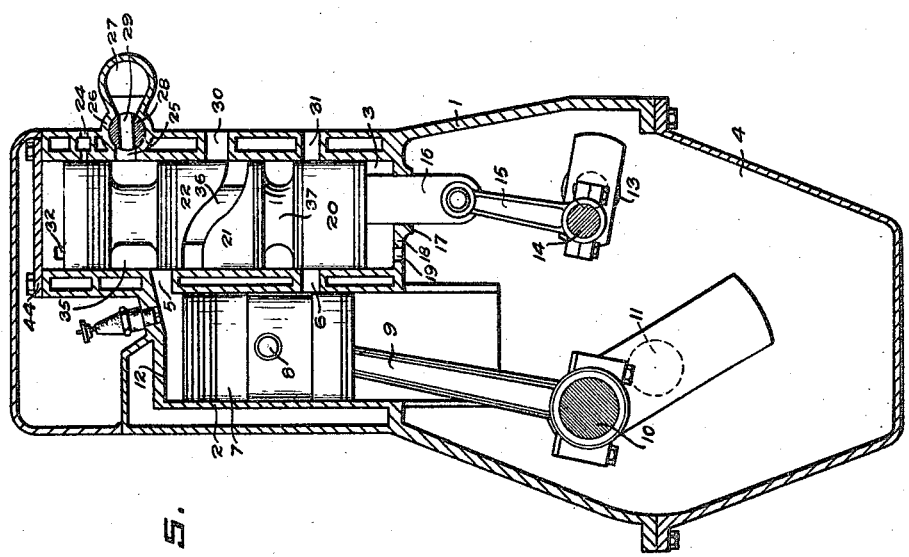
INVENTOR
JAMES B. BAYNES Patented Oct. 5, 1926.

1,601,842

UNITED STATES PATENT OFFICE.

JAMES BIBBY BAYNES, OF BUFFALO, NEW YORK.

FOUR-CYCLE INTERNAL-COMBUSTION ENGINE.

Application filed October 16, 1925. Serial No. 62,859.

My invention relates to improvements in four-cycle internal combustion engines of the piston valve type as shown in my prior Patent No. 1,257,447 of February 26, 1918, and the object of the invention is to insert a secondary valve for controlling the upper exhaust in combination with the reciprocal piston valve which controls the various cycle functions of the engine and a further and particular object of the invention is to time the movement of the piston valve so that the secondary valve is not exposed to the intense heat of the burning gases during the ignition and the working stroke thus preventing such valve being subjected to any great fluctuations of temperature. A still further object of the invention is to provide a partition or floor at the bottom of the piston valve cylinder, the piston valve rod passing therethrough, such partition being suitably perforated to only permit a predetermined amount of oil vapor being sucked upwardly from the crank case upon the upward movement of the piston valve for lubricating the wall of the piston valve cylinder.

My invention consists of an internal combustion engine cylinder, a vertical piston valve cylinder positioned adjacent thereto, a combined inlet and exhaust port at the upper end of the engine cylinder communicating with the piston valve cylinder, a main exhaust port at the lower end of the engine cylinder also communicating with the piston valve cylinder and a piston valve which is adapted to reciprocate in the piston valve cylinder and provided with intake and exhaust passages, also a fuel combustion chamber wherein the major part of the explosive mixture is compressed and ignited. A secondary exhaust port also positioned in the upper part of the piston valve cylinder and provided with a rotary valve for controlling the passage of gases therethrough.

My invention consists of an engine constructed and arranged all as hereinafter more particularly described and illustrated in the accompanying drawing in which:

Fig. 1 is a transverse vertical sectional view through the engine showing the engine and valve cylinders, the piston and valve being at the positions occupied when approaching the middle of the induction stroke.

Fig. 2 is a similar section showing the piston approaching the end of the compression stroke.

Fig. 5 is a similar section showing the piston approaching the upper end of the exhaust stroke, the rotary valve being open to permit the remainder of the burnt gas in the cylinder being ejected through the combustion chamber in the piston valve.

Fig. 6 is an end elevational view of the engine block showing the means for rotating the piston valve crank shaft and the rotary valve from the engine crank shaft.

Like characters of reference indicate the corresponding parts in the different views.

Figure 4:
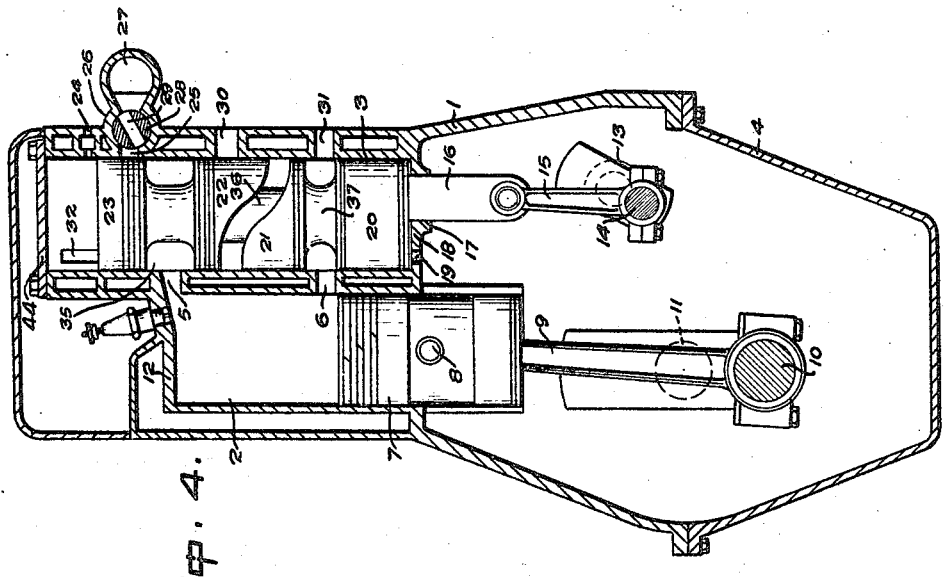
Fig. 4 is a similar section showing the engine at the bottom of the power stroke, the main exhaust port being uncovered to permit the major portion of the burnt gases passing from the engine cylinder.

The crank case in this engine is of the split-type, the upper half 1 being cast integrally with the engine cylinder 2 and cylindrical valve chamber 3, the lower half constituting the oil-pan 4. It is understood that any other construction of crank case may be used without impairing the efficiency of my engine.

The engine cylinder is provided with an upper port 5 and with a lower or exhaust port 6, the former acting in the capacity of both an intake and exhaust port, the flame also passing therethrough from the spark plug to the ignition or compression chamber at the firing period. 7 is the engine piston provided with the usual piston pin 8 to which the connecting rod 9 is pivotally connected in the usual manner, the lower end of the connecting rod being mounted upon the crank pin 10 on the crank shaft 11. The travel of the piston is so designed in relation to the head 12 of the cylinder that as small a clearance as possible is used in order to practically effect the complete scavenging of the cylinder volume.

For reciprocating the piston valve, I provide a crank shaft 13 carrying the crank pin 14 to which the lower end of the connecting rod 15 is connected, its upper end being pivotally secured to the lower end of the piston valve rod 16 which passes through an orifice 17 in the partition or floor 18 at the bottom of the piston valve cylinder 3, such floor having suitable perforations 19 therein. The crank shaft 13 rotates at half the speed of the engine crank shaft and may be rotated either in a clockwise or anti-clockwise direction. The degree of lead which the valve crank pin 14 bears in relation to the crank pin 10 may be varied through experiment, in Figure 4 of the drawings a lead is shown of about 60 degrees.

The piston valve consists of four connected cylindrical portions 20, 21, 22 and 23. The valve cylinder is formed with an air intake port 24, an upper exhaust port 25 which communicates with the rotary valve casing 26 which in turn communicates with an exhaust manifold 27. 28 is the rotary valve through which the port 29 extends, the valve being mounted in the casing 26. The piston valve cylinder also contains a fuel intake port 30 situated intermediately of its height and a lower exhaust port 31 situated in the vicinity of the lower portion of the valve cylinder being placed approximately opposite the port 6. 32 is a by-pass in the upper end of the valve cylinder wall and adapted to convey air which is compressed between the head of the piston valve and the cylinder top 44 into the ignition chamber as will be hereinafter more fully described. The lower end of the by-pass 32 is provided with a pair of upper and lower outlet ports 33 and 34.

Between the spaced apart portions 22 and 23 of the piston valve a fuel compression and ignition chamber 35 is constituted, and between the spaced apart portions 21 and 22 a curved fuel intake passage 36 which leads from the port 30 to the port 5 in the cylinder head is constituted. An exhaust passage 37 is formed between the spaced apart valve portions 20 and 21 and constitutes a communication between the exhaust port 6 in the engine cylinder and the exhaust 31 in the piston valve cylinder.

The rotary valve 28 may be rotated by any suitable mechanism actuated by the engine crank shaft such as illustrated in Figure 6. The mechanism in this figure consists of a sprocket wheel 38 secured upon the outer end of the engine crank shaft 11 and a larger sprocket wheel 39 secured upon the outer end of the piston valve crank shaft 13, the sprocket wheels being connected by means of the sprocket chain 40. The end of the rotary valve 28 projects through the end of the engine block and is provided with a sprocket wheel 41 suitably secured thereon, the piston valve crank shaft 13 is provided with a second sprocket wheel 42, the sprocket wheels 41 and 42 being connected by means of the sprocket chain 43. The sprocket wheel 39 is so dimensioned in relation to the sprocket wheel 28 that the piston valve crank shaft 13 has half of the rotative speed of the engine crank shaft 11. The sprocket wheel 41 on the rotary valve is so dimensioned in relation to the sprocket wheel 42 upon the piston valve crank shaft 13 that the rotary valve rotates at half the speed of the piston valve crank shaft 13 or one quarter the speed of the engine crank shaft 11. It will thus be seen that the rotary valve has half a revolution or a movement of 180 degrees for every four strokes or cycle of the engine, the valve rotating in the same direction as the two crank shafts.

The operation of my engine is as follows:—

When the engine parts are in the position shown in Figure 1 and the engine is running, the two crank shafts, and rotary valve are rotating in a clockwise direction, the piston 7 moving downwardly and the piston valve moving upwardly being just at the upper end of its travel, the inlet port 30 having communication through the passage-way 36 with the port 5 in the engine cylinder head. As the piston 7 is moving downwardly a charge is sucked into the engine cylinder through the passage-way 36, the communication between the ports 5 and 30 remaining open until the piston 7 reaches the bottom of its stroke. As it takes an appreciable period for the charge to acquire its full flowing velocity in entering the cylinder when the engine is running at high speed it has been found practicable to open the connection between the ports 5 and 30 an instant before the piston 7 moves downwardly on the suction stroke.

As the cylinder 2 becomes charged with fuel the piston valve reaches the limit of its upward movement and on coming down gradually cuts off the connection between the ports 5 and 30 continuing until about just the time that the piston has reached the end of its induction stroke, at which moment the piston is moving at its minimum velocity as the crank pin 10 is just passing the bottom dead center while the piston valve is moving downwardly approaching its maximum velocity thus permitting the inlet port being left open as long as possible and rapidly closed.

Figure 3:
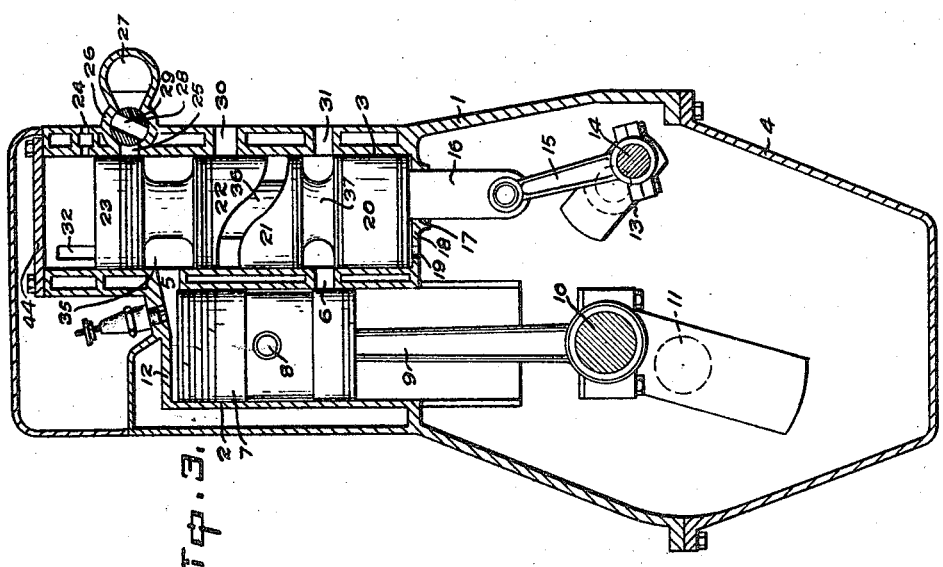
Fig. 3 is a similar section showing the beginning of the power stroke.

As the piston valve crank shaft has half of the rotative speed of the engine crank shaft it will be apparent that the piston valve will still be moving downwardly while the engine piston is moving upwardly on the compression stroke and on reference to Figure 2 it will be seen that the compression and ignition chamber 35 will be opposite the port 5 in the cylinder head as the piston approaches the top dead center, as a result the fuel becomes compressed in this chamber and is then ignited. At this period the piston valve is practically at the lower end of its stroke and during the power stroke passes the bottom dead center and begins to move upwardly, the compression chamber 35 remaining in communication with the port 5 in the engine cylinder during the entire power stroke as illustrated in Figures 3 and 4.

When the piston reaches the lower end of the power stroke the piston valve is so positioned that the exhaust passage 37 coincides with the lower exhaust port 6 in the engine cylinder and the exhaust port 31 in the piston valve cylinder thus permitting the egress of the major portion of the burnt gases when the piston 7 uncovers the port 6.

The piston 7 now moves upwardly in the engine cylinder on the exhaust stroke and drives the remnants of the burnt gases left in the cylinder into the compression chamber 35 from whence they pass through the uncovered port 29 of the rotary valve into the exhaust manifold 27, the chamber 35 being still in communication with the port 5, the piston valve moving upwardly as shown in Figure 5. When the piston valve was moving downwardly air was inducted through the air intake port 24 into the space constituted between the top of the piston valve and the head 44 of the valve cylinder. As the piston valve moves upwardly the port 24 is covered and the air in the head of the valve cylinder is compressed. It will be seen that as the piston 7 moves upwardly upon the exhaust stroke and drives the remnants of the burnt gases through the compression chamber 35 to the exhaust port 29 in the rotary valve that a small residue of burnt gases will remain in the chamber 35.

As this engine is particularly designed to eliminate all burnt gases during each cycle in order to admit only pure fuel into the cylinder at each induction stroke and to prevent the premature expansion of the charge due to contact with hot burnt gases it is necessary to blow out the residue of burnt gas left in the compression chamber 35. This is achieved in the following way. When the piston valve moves upwardly and covers the port 5 during the latter part of the exhaust stroke as before described, the air in the piston valve cylinder head is being compressed, the piston valve moving upwardly until the lower port 34 at the bottom of the by-pass 32 is uncovered which permits the compressed air surging into the compression chamber 35 and blowing the remnant of the burnt gas out through the still open rotary valve port 29. As the piston valve moves upwardly a further degree the upper port 33 is uncovered thus permitting the remainder of the compressed air entering the compression chamber from both ports and completely scavenging as illustrated in Figure 1.

In this figure the piston valve is shown just past its top dead center, the compressed air having already been injected into the compression chamber 35, while the port 29 of the rotary valve was more open than shown in this figure to permit the air charge blowing the residue of burnt gases out therethrough.

On reference to Figure 1 it will be seen that while the remnants of burnt gases are being ejected from the compression chamber 35 that the engine piston is traveling downwardly in its cylinder on the induction stroke and that a fresh charge is being inducted as before described. It will be seen in reference to Figure 2 that while the charge is being compressed in the compression chamber 35 that the rotary valve 28 is closed. As the piston approaches the top dead center the piston valve is moving downwardly until at the moment of firing the port 25 communicating with the rotatary valve is covered by the upper portion 20 of the piston valve thus preventing the ignited mixture coming in contact with the rotary valve.

By my particular construction and timing of the moving parts I have obviated the great weakness of rotary valves used in internal combustion engines. In previous exhaustive tests in which rotary valves were used and exposed to the intense heat of combustion it was found that after a few hours of running they became distorted and eroded, either siezing altogether or leaking. The primary functions however of my rotary valve is not to close the port openings during the ignition and working stroke but to effect a closure of the upper exhaust port when the piston is traveling upwardly upon the compression stroke, the communication between the face of the rotary valve and the compression or combustion chamber 35 being cut off during ignition and expansion as before described.

By the provision of the perforated floor 18 in the bottom of the piston valve cylinder I have provided means whereby a limited quantity of oil saturated vapor in the crank case is drawn upwardly through the perforations upon the upward movement of the piston valve, the oil being distributed upon the walls of the cylinder and carried upwardly by the piston valve rings thus insuring an efficient lubrication of the cylinder walls.

From the above description it will be apparent that I have constructed an engine of the piston valve type wherein it has been made possible to completely scavenge the burnt gases therefrom thus enabling me to construct an engine from which a greater horse power will be obtained than from an engine of the same cylinder volume and of the conventional type. Furthermore I have successfully incoporated a rotary valve for controlling the passage of exhaust gases through my piston valve and as such rotary valve is not exposed to great variations of temperature have overcome the failings of valves of this type.

It will be understood that my construction need not necessarily exactly adhere to the above description and drawings, that any other type of valve might be substituted for my rotary valve producing the same beneficial results without departing from my principle wherein the details of construction may be all modified without departing from the spirit of the invention.

What I claim as my invention is:—

1. In an internal combustion engine, the combination of a cylinder and a piston reciprocal therein, a valve chamber adjacent to and connected to the cylinder by a port, a valve slidable in the valve chamber, an ignition chamber in the valve through which a portion of the exhaust gases pass to an exhaust port in the valve chamber during the exhaust stroke of the piston, and in which the inducted charge is compressed during the compression stroke of the piston, and a rotary valve at the exhaust port for permitting the egress of exhaust gases therethrough during the exhaust stroke and preventing the egress of the inducted charge during the compression stroke.

2. In an internal combustion engine, the combination of a cylinder and a piston reciprocal therein, a valve chamber adjacent to and connected to the cylinder by a port, a valve slidable in the valve chamber, an ignition chamber in the valve through which a portion of the exhaust gases pass to an exhaust port in the valve chamber during the exhaust stroke of the piston, a valve at the exhaust port for preventing the egress of the inducted charge during a portion of the compression stroke, and means for cutting off the communication between the valve closure of the exhaust port and the ignition chamber during the ignition and expansion periods of the engine.

3. In an internal combustion engine, the combination of a cylinder and a piston reciprocal therein, a valve chamber adjacent to and connected to the cylinder by a port, a valve slidable in the valve chamber, an ignition chamber in the valve through which a portion of the exhaust gases pass to an exhaust port in the valve chamber during the exhaust stroke of the piston, a rotary valve at the exhaust port for preventing the egress of the inducted charge during a portion of the compression stroke, and means for cutting off the communication between the rotary valve closure of the exhaust port and the ignition chamber during the ignition and expansion periods of the engine.

4. In an internal combustion engine, the combination of a cylinder and a piston reciprocal therein, a valve chamber adjacent to and connected to the cylinder by a port, a piston valve reciprocal in the valve chamber, an ignition chamber in the piston valve, through which a portion of the exhaust gases pass to an exhaust port in the valve chamber during the exhaust stroke of the piston and in which the inducted charge is compressed during the compression stroke of the piston, an exhaust valve in the exhaust port for preventing the egress of the inducted charge during a portion of the compression stroke, and means for cutting off the communication between the ignition chamber and the exhaust valve during the latter period of the compression stroke for preventing the ignited charge coming in contact with said exhaust valve.

5. In an internal combustion engine, the combination of a cylinder and a piston reciprocal therein, a valve chamber adjacent to and connected to the cylinder by a port, a piston valve reciprocal in the valve chamber, an ignition chamber in the piston valve, through which a portion of the exhaust gases pass to an exhaust port in the valve chamber during the exhaust stroke of the piston and in which the inducted charge is compressed during the compression stroke of the piston, a rotary exhaust valve in the exhaust port for preventing the egress of the inducted charge during a portion of the compression stroke, and means for cutting off the communication between the ignition chamber and the rotary exhaust valve during the latter period of the compression stroke for preventng the ignited charge coming in contact with said exhaust valve.

6. In an internal combustion engine, the combination of a cylinder and a piston reciprocal therein, a movable ignition chamber, an exhaust port having an exhaust valve therein communicating with the ignition chamber during the exhaust and part of the compression strokes, and means for moving the ignition chamber away from the exhaust port and exhaust valve to cut off the communication therewith during the ignition period.

7. An internal combustion engine comprising a power cylinder, a piston reciprocal therein, a piston valve chamber communicating through a port with the power cylinder, and having exhaust and intake ports therein, a rotary valve in the exhaust port, a piston valve reciprocal in the piston valve chamber, means controlled by the movement of the piston valve for admitting the explosive mixture through the intake port, and means controlled by the rotary valve for permitting the exhaustion of exhaust gases through the exhaust port.

8. An internal combustion engine comprising a power cylinder, a piston reciprocal therein, a valve chamber adjacent thereto and connected intermediately of its length to the upper end of said cylinder by a port and also provided with intake and exhaust ports, a piston valve provided with a transverse passage and with an ignition chamber intermediate of its ends, a rotary valve in the exhaust port, and means for moving the piston valve so that the ignition chamber is in communication with the connecting port of the engine cylinder and the exhaust port in the valve chamber during the compression stroke, and means for closing the rotary valve to prevent the egress of the compressed charge in the ignition chamber through the exhaust port during the compression stroke of the engine.

JAMES BIBBY BAYNES.